(12) United States Patent
Lee

(10) Patent No.: US 11,904,943 B2
(45) Date of Patent: Feb. 20, 2024

(54) CHASSIS FRAME

(71) Applicants: Hyundai Motor Company, Seoul (KR); Kia Corporation, Seoul (KR)

(72) Inventor: Han Jong Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/811,943

(22) Filed: Jul. 12, 2022

(65) Prior Publication Data

US 2023/0174156 A1 Jun. 8, 2023

(30) Foreign Application Priority Data

Dec. 8, 2021 (KR) .................. 10-2021-0174897

(51) Int. Cl.
*B62D 21/12* (2006.01)
*B62D 65/02* (2006.01)
*B62D 27/06* (2006.01)
*B62D 21/03* (2006.01)

(52) U.S. Cl.
CPC ............. *B62D 21/12* (2013.01); *B62D 21/03* (2013.01); *B62D 27/065* (2013.01); *B62D 65/02* (2013.01)

(58) Field of Classification Search
CPC ...... B62D 21/12; B62D 27/065; B62D 21/03; B62D 21/08
USPC ........................................................ 280/783
See application file for complete search history.

(56) References Cited

U.S. PATENT DOCUMENTS

| 7,967,338 B1* | 6/2011 | Anderson | B60P 3/36 |
| | | | 280/789 |
| 2004/0062620 A1* | 4/2004 | Deets | B62D 33/0612 |
| | | | 410/4 |
| 2011/0121554 A1* | 5/2011 | Olson | B62D 21/20 |
| | | | 280/781 |
| 2021/0086682 A1* | 3/2021 | Zanassi | A01K 1/0035 |
| 2022/0227430 A1* | 7/2022 | Min | B62D 27/06 |

FOREIGN PATENT DOCUMENTS

| CN | 204130611 U | * 1/2015 | |
| EP | 3239022 A1 | * 11/2017 | ............... B60P 3/00 |

* cited by examiner

*Primary Examiner* — Paul N Dickson
*Assistant Examiner* — Matthew D Lee
(74) *Attorney, Agent, or Firm* — Slater Matsil, LLP

(57) ABSTRACT

An embodiment chassis frame includes a plurality of partitions extending downwardly from an upper frame and having lower portions and a reinforcing member detachably connected to the lower portions of adjacent ones of the partitions. An embodiment chassis frame includes a plurality of partitions extending downwardly from an upper frame and having lower portions and a reinforcing member detachably connected to the lower portions of adjacent ones of the partitions, the reinforcing member including a first end portion and a second end portion opposing the first end portion, the first end portion and the second end portion detachably connected to the lower portions of the corresponding partitions, respectively, and a second reinforcing bracket at least partially surrounding an exterior surface of the second end portion, the second reinforcing bracket detachably connected to the lower portion of the corresponding partition through a second bolt and a second nut.

18 Claims, 9 Drawing Sheets

CHASSIS FRAME

CROSS-REFERENCE TO RELATED APPLICATIONS

This application claims the benefit of Korean Patent Application No. 10-2021-0174897, filed on Dec. 8, 2021, which application is hereby incorporated herein by reference.

TECHNICAL FIELD

The present disclosure relates to a chassis frame.

BACKGROUND

A vehicle includes a chassis frame supporting a vehicle body. The chassis frame may be disposed under a floor. In order to improve aerodynamics and driving performance, relatively heavy modules such as a battery module and a hydrogen tank module may be detachably disposed on the chassis frame.

The chassis frame may include an upper frame, a lower frame spaced apart from the upper frame, and a plurality of partition frames disposed between the upper frame and the lower frame. The plurality of partition frames may be spaced apart from each other by a predetermined gap between the upper frame and the lower frame so that a space between the upper frame and the lower frame may be divided into a plurality of mounting spaces. The relatively heavy modules such as the battery module and the hydrogen tank module may be individually mounted in the plurality of mounting spaces. A top end of each partition frame may be directly joined to the upper frame, and a bottom end thereof may be directly joined to the lower frame. Thus, the chassis frame may have enough stiffness to stably support the vehicle body.

When the modules and the chassis frame are assembled, the modules cannot be vertically loaded into the mounting spaces since the lower frame at least partially closes the mounting spaces. Accordingly, the modules may be laterally loaded, which makes the assembly of the modules difficult.

When the lower frame is removed in order to facilitate the assembly of the modules, stiffness of the chassis frame may be reduced. As a result, the chassis frame may be deformed or bent when being transported or stored.

The above information described in this background section is provided to assist in understanding the background of the inventive concept, and may include any technical concept which is not considered as the prior art that is already known to those skilled in the art.

SUMMARY

The present disclosure relates to a chassis frame. Particular embodiments relate to a chassis frame having a plurality of reinforcing members detachably connected to a lower portion thereof, thereby effectively preventing the chassis frame from being deformed or bent during transportation and storage of the chassis frame.

Embodiments of the present disclosure can solve problems occurring in the prior art while advantages achieved by the prior art are maintained intact.

An embodiment of the present disclosure provides a chassis frame having a reinforcing member detachably connected to a lower portion thereof, thereby facilitating the assembly of various modules and effectively preventing the chassis frame from being deformed or bent during transportation and storage of the chassis frame.

According to an embodiment of the present disclosure, a chassis frame may include an upper frame, a plurality of partitions extending downwardly from the upper frame, and a reinforcing member detachably connected to lower portions of adjacent partitions.

The reinforcing member may connect the adjacent partitions, thereby stably maintaining stiffness of the chassis frame during transportation and storage of the chassis frame. A space under the upper frame may be divided into a plurality of mounting spaces by the plurality of partitions. When the reinforcing member is detached from the partitions, modules may be vertically and upwardly loaded and assembled in the corresponding mounting spaces of the chassis frame. That is, as the reinforcing member is separated from the partitions, the modules may be easily loaded vertically and upwardly from the bottom of the chassis frame, and thus the assembly process thereof may be very simplified.

The reinforcing member may extend in a longitudinal direction of the upper frame. The reinforcing member may include a first end portion and a second end portion opposing the first end portion, and the first end portion and the second end portion may be detachably connected to the lower portions of the corresponding partitions, respectively.

The end portions of the reinforcing member may be detachably connected to the lower portions of the corresponding partitions, respectively, so that the reinforcing member may connect the lower portions of the adjacent partitions in the longitudinal direction of the chassis frame.

The reinforcing member may further include a pair of first reinforcing brackets provided on both sides of the first end portion. Each first reinforcing bracket may include a mounting wall which is detachably mounted on the lower portion of the corresponding partition through a first bolt and a first nut.

The pair of first reinforcing brackets may increase stiffness of the first end portion of the reinforcing member. In particular, the pair of first reinforcing brackets may be joined to the lower portion of the corresponding partition through the first bolt and the first nut, thereby improving the mounting stiffness of the first end portion.

The first reinforcing bracket may further include a fixed wall which is fixed to a side surface of the first end portion, and the fixed wall may extend in a longitudinal direction of the reinforcing member.

As the fixed wall is directly fixed to the side surface of the first end portion, the first reinforcing bracket may be more firmly fixed to the first end portion.

The mounting wall may be perpendicular to the fixed wall, and the first reinforcing bracket may further include a connection rib connecting the mounting wall and the fixed wall.

The mounting wall and the fixed wall of the first reinforcing bracket may be connected to each other by the connection rib, thereby significantly increasing its own stiffness.

The reinforcing member may further include a support plate connecting bottom ends of the pair of first reinforcing brackets, and the support plate may protrude from the mounting wall of the first reinforcing brackets in opposite directions.

The support plate may support a bottom surface of the partition and a bottom surface of the first end portion of the reinforcing member together, and thus the partition and the reinforcing member may be stably supported by the support plate.

The mounting wall may have a first surface directly contacting the corresponding partition and a second surface opposing the first surface. The reinforcing member may further include a first stopper provided on the second surface of the mounting wall, the first stopper may have a U-shaped recess, and the first nut may be received in the U-shaped recess of the first stopper.

As the first nut is received in and restricted by the U-shaped recess of the first stopper, the first nut may be accurately aligned and positioned in the through hole of the mounting wall.

The reinforcing member may further include a second reinforcing bracket at least partially surrounding an exterior surface of the second end portion. The second reinforcing bracket may be detachably connected to the lower portion of the corresponding partition through a second bolt and a second nut.

The second reinforcing bracket may be connected to the reinforcing member while surrounding the exterior surface of the second end portion, thereby increasing stiffness of the second end portion of the reinforcing member. In particular, the second end portion and the second reinforcing bracket may be directly joined to the lower portion of the corresponding partition through the second bolt and the second nut, thereby improving the mounting stiffness of the second end portion.

The second reinforcing bracket may include a top wall attached to a top surface of the second end portion, and a pair of side walls attached to both side surfaces of the second end portion, respectively.

The second reinforcing bracket may be directly attached to the side surfaces and the top surface of the second end portion except for a bottom surface of the second end portion, thereby improving stiffness of the second end portion.

The reinforcing member may further include a second stopper attached to a bottom surface of the second end portion, the second stopper may have a U-shaped recess, and the second nut may be received in the U-shaped recess of the second stopper.

As the second nut is received in and restricted by the U-shaped recess of the second stopper, the second nut may be accurately aligned and positioned in the through hole of the second end portion.

A longitudinal axis of the first bolt may be parallel to a longitudinal axis of the reinforcing member.

A longitudinal axis of the second bolt may be perpendicular to a longitudinal axis of the reinforcing member.

Accordingly, the longitudinal axis of the first bolt may be perpendicular to the longitudinal axis of the second bolt, and a fastening direction of the first bolt may be perpendicular to that of the second bolt. By fastening the second end portion of the reinforcing member and the lower portion of the corresponding partition using the second bolt and the second nut, and then fastening the first end portion of the reinforcing member and the lower portion of the corresponding partition using the first bolt and the first nut in a state in which the first end portion of the reinforcing member is accurately aligned with the lower portion of the corresponding partition, the reinforcing member may be held in position between the lower portions of the two adjacent partitions.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
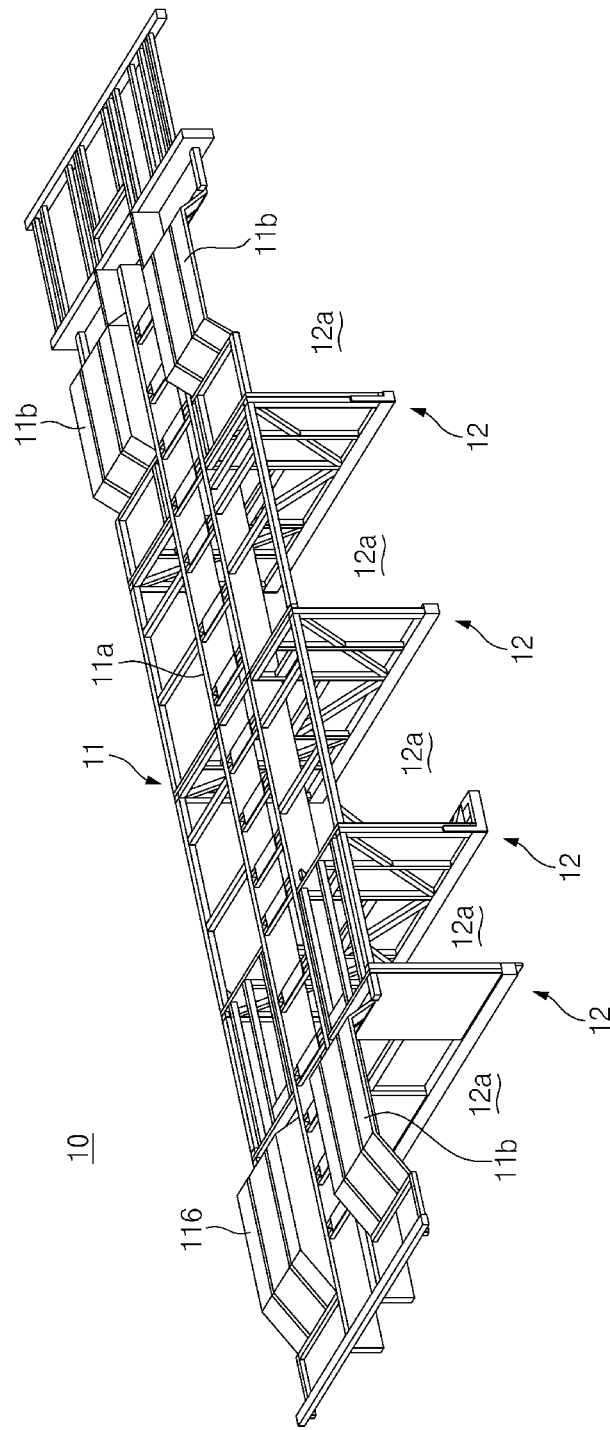
FIG. 1 illustrates a perspective view of a chassis frame according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a chassis frame 10 according to an exemplary embodiment of the present disclosure may include an upper frame 11 and a plurality of partitions 12 joined to the upper frame 11.

The upper frame 11 may include a ladder frame 11*a* extending in a longitudinal direction of the vehicle, and a plurality of support members connected to the ladder frame 11*a*. The upper frame 11 may include a plurality of wheel houses 11*b*, and each wheel house 11*b* may cover an upper portion of a wheel.

Figure 6:
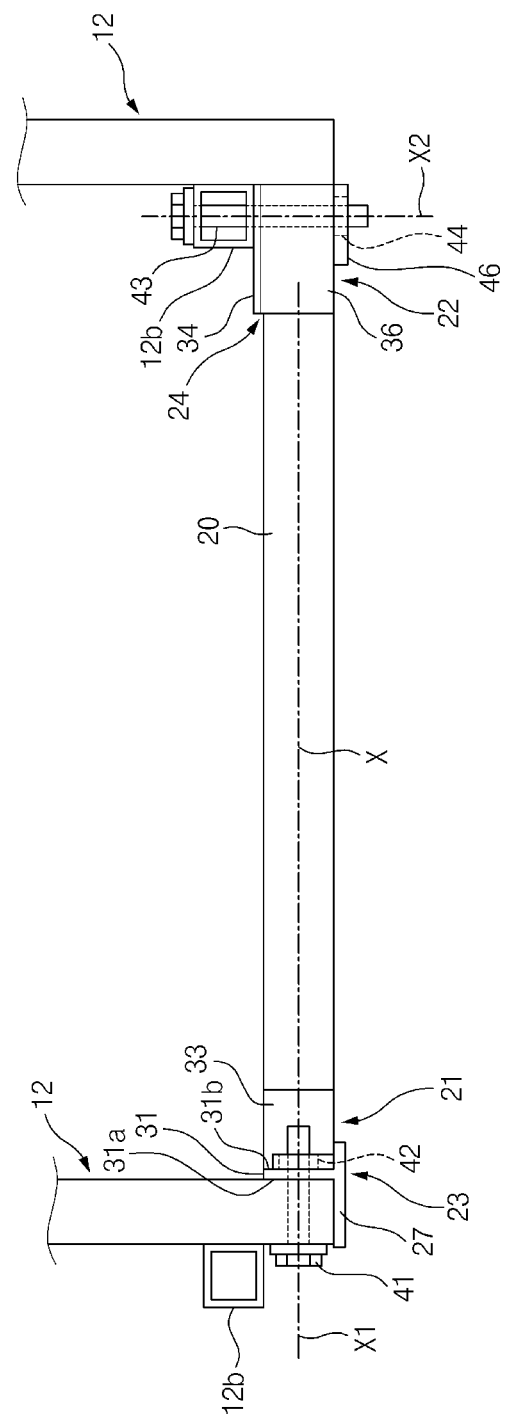
FIG. 6 illustrates a state in which a reinforcing member is mounted between adjacent partitions in a chassis frame according to an exemplary embodiment of the present disclosure.

Each partition 12 may extend downwardly from the upper frame 11, and the partition 12 may extend in a width direction of the upper frame 11. Each partition 12 may include one or more transverse members extending in a width direction of the vehicle, one or more diagonal members extending diagonally, and one or more vertical members extending vertically. The partition 12 may include a plate joined to the transverse members, the diagonal members, and the vertical members. Referring to FIG. 6, each partition 12 may include a lower reinforcing member 12b attached to a lower portion thereof, and the lower reinforcing member 12b may extend in the width direction of the upper frame 11 (that is, a longitudinal direction of the partition 12).

The plurality of partitions 12 may be spaced apart from each other in a longitudinal direction of the upper frame 11, and accordingly a space under the upper frame 11 may be divided into a plurality of mounting spaces 12a by the plurality of partitions 12, and each mounting space 12a may be downwardly opened. Relatively heavy modules such as a battery module, a hydrogen tank module, and an air tank module may be individually disposed in the mounting spaces 12a, and each module may be detachably mounted on the chassis frame.

Figure 2:
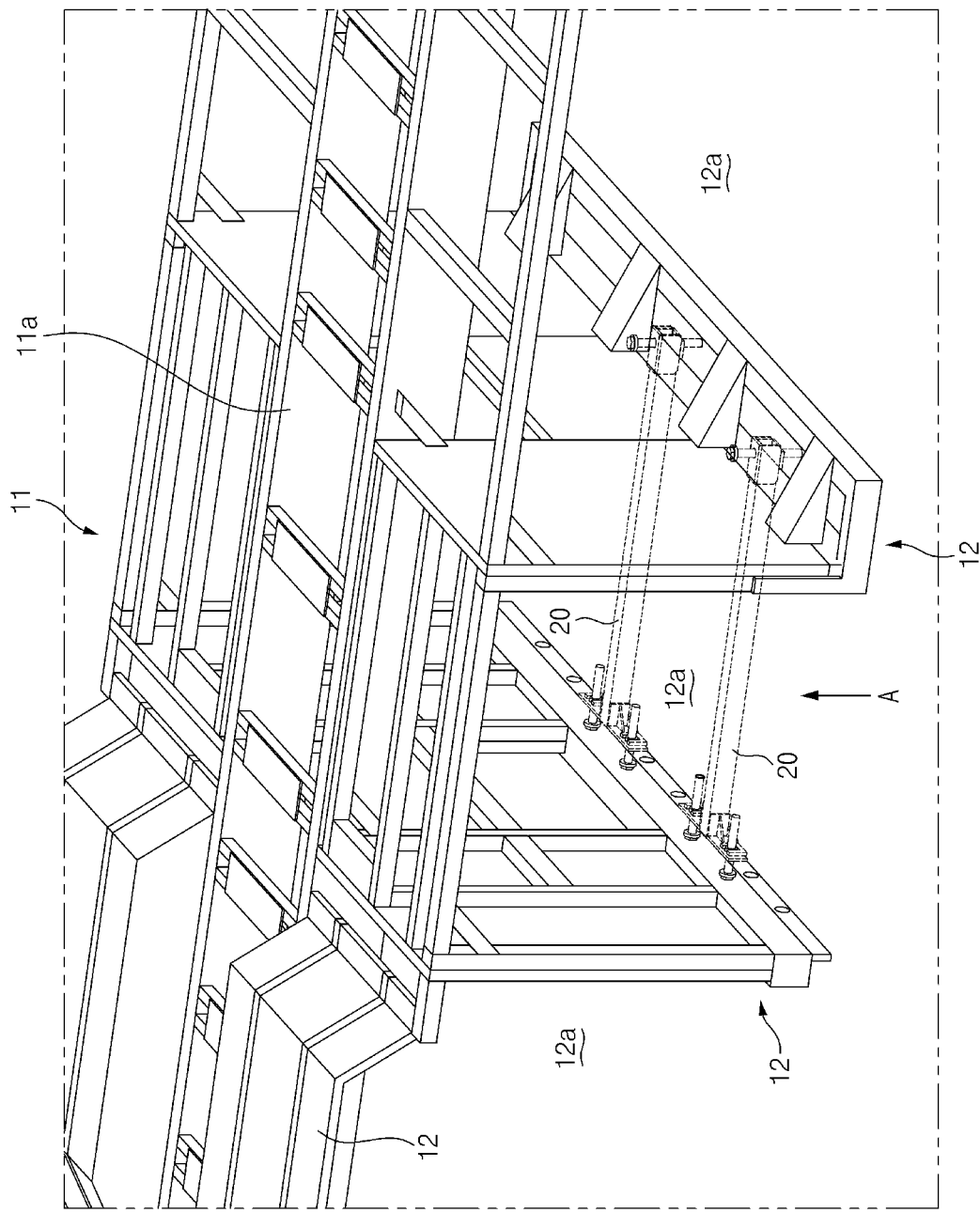
FIG. 2 illustrates a state in which a plurality of reinforcing members are mounted on a chassis frame according to an exemplary embodiment of the present disclosure.
Figure 3:
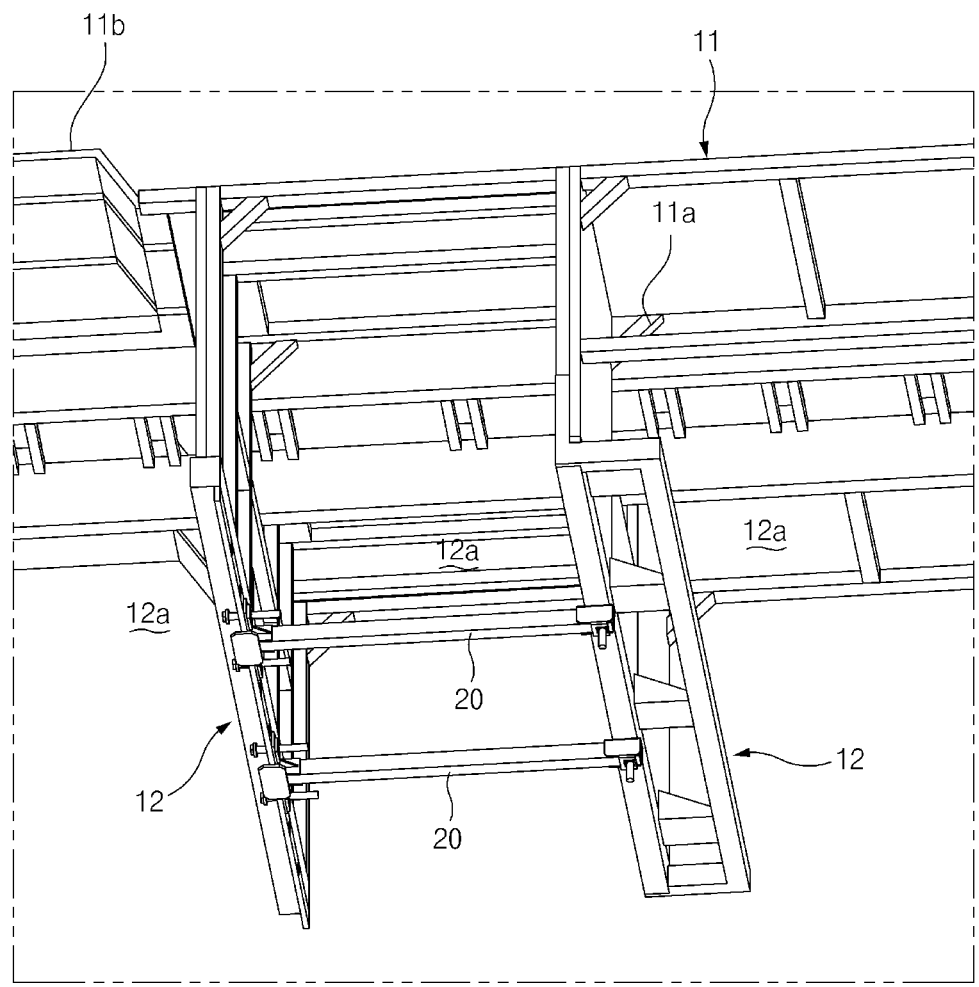
FIG. 3 illustrates a view when viewed in a direction indicated by arrow A of FIG. 2.

Referring to FIG. 2, the chassis frame 10 according to an exemplary embodiment of the present disclosure may include one or more reinforcing members 20 detachably connected to the lower portions of the adjacent partitions 12, and each reinforcing member 20 may extend in the longitudinal direction of the upper frame 11. Both end portions of the reinforcing member may be detachably connected to the lower portions of two adjacent partitions 12, respectively, so that the lower portions of the two adjacent partitions 12 may be connected to each other in the longitudinal direction of the vehicle. The reinforcing members 20 may connect the lower portions of the two adjacent partitions so that stiffness of the chassis frame 10 may be entirely increased by the reinforcing members 20.

When the reinforcing members 20 are detached from the adjacent partitions 12, the mounting spaces 12a defined by the partitions 12 may be downwardly opened, and various modules may be vertically and upwardly loaded and assembled from the bottom of the chassis frame 10 toward the corresponding mounting spaces 12a.

In a condition in which the lower portions of the adjacent partitions 12 of the chassis frame 10 are not connected to each other, the stiffness of the chassis frame 10 may be reduced, which may easily result in the bending, deformation, and/or the like of the chassis frame 10. In particular, before the modules are mounted in the mounting spaces of the chassis frame 10, the chassis frame 10 may be bent or deformed while being stored or transported. When the chassis frame 10 is stored or transported, the plurality of reinforcing members 20 may be joined to the lower portions of the plurality of partitions 12, respectively, so that they may connect the lower portions of the partitions 12 in a longitudinal direction of the chassis frame 10. When the plurality of reinforcing members 20 are joined to the lower portions of the partitions 12, the stiffness of the adjacent partitions 12 may be increased by the plurality of reinforcing members and thus the bending, deformation, and/or the like of the chassis frame 10 may be effectively prevented.

When the modules are assembled to the mounting spaces 12a divided by the partitions 12, the reinforcing members 20 may be separated from the lower portions of the partitions 12 so that the modules may be loaded vertically and upwardly from the bottom of the chassis frame 10. Thus, an assembly process thereof may be easily and simply performed.

According to a specific exemplary embodiment, each end portion of the reinforcing member 20 may be detachably connected to the lower portion of the corresponding partition 12. Referring to FIGS. 3 to 6, the reinforcing member 20 may include a first end portion 21 and a second end portion 22 opposing the first end portion 21. For example, the first end portion 21 may face the front of the vehicle, and the second end portion 22 may face the rear of the vehicle. The first end portion 21 of the reinforcing member 20 may be detachably connected to the lower portion of the corresponding partition 12 through a first bolt 41 and a first nut 42, and the second end portion 22 of the reinforcing member 20 may be detachably connected to the lower portion of the corresponding partition 12 through a second bolt 43 and a second nut 44.

A pair of first reinforcing brackets 23 may be provided on both sides of the first end portion 21, and accordingly stiffness of the first end portion 21 of the reinforcing member 20 may be increased by the pair of first reinforcing brackets 23. Each first reinforcing bracket 23 may include a mounting wall 31 which is detachably mounted on the lower portion of the corresponding partition 12. That is, the pair of first reinforcing brackets 23 may be directly joined to the lower portion of the partition 12 so that the mounting stiffness of the first end portion 21 of the reinforcing member 20 may be improved.

The first reinforcing bracket 23 may include a fixed wall 33 which is fixed to a side surface of the first end portion 21 of the reinforcing member 20, and the fixed wall 33 may be perpendicular to the mounting wall 31. The fixed wall 33 may be fixed to the side surface of the first end portion 21 of the reinforcing member 20 by welding, using fasteners, and/or the like, and the pair of fixed walls 33 may be oppositely attached to both side surfaces of the reinforcing member 20 so that the first reinforcing bracket 23 may firmly bear a torque of the first bolt 41 when the first bolt 41 is screwed into the first nut 42, and the mounting stiffness of the first end portion 21 of the reinforcing member 20 may be further improved. The fixed wall 33 may extend in a longitudinal direction of the reinforcing member 20, and the mounting wall 31 may be perpendicular to the reinforcing member 20 and the fixed wall 33. That is, the first reinforcing bracket 23 may have an L shape with the mounting wall 31 and the fixed wall 33 perpendicular to each other. Each first reinforcing bracket 23 may further include a connection rib 35 for diagonally connecting the mounting wall 31 and the fixed wall 33. The first reinforcing bracket 23 may have the mounting wall 31 and the fixed wall 33 connected by the connection rib 35, thereby significantly increasing its own stiffness.

A support plate 27 may connect the pair of first reinforcing brackets 23. The support plate 27 may connect bottom ends of the mounting walls 31 and bottom ends of the fixed walls 33. In particular, the support plate 27 may protrude from the mounting walls 31 of the first reinforcing brackets 23 in opposite directions. For example, the support plate 27 may protrude from the mounting walls 31 of the first reinforcing bracket 23 toward the front and rear of the vehicle. When the reinforcing member 20 is connected to the partition 12 through the pair of first reinforcing brackets 23, the support plate 27 may directly contact and support a bottom surface of the first end portion 21 of the reinforcing member 20 and a bottom surface of the partition 12. Thus, the plurality of support plates 27 may support the bottom surfaces of the partitions 12 and the bottom surfaces of the first end portions 21 of the reinforcing members 20, thereby preventing the chassis frame 10 from falling even if some fasteners are damaged.

Referring to FIG. 6, the mounting wall 31 may have a first surface 31a directly contacting the partition 12, and a second surface 31b opposing the first surface 31a. The mounting wall 31 may have a through hole through which the first bolt 41 passes. The first nut 42 may be aligned with the through hole of the mounting wall 31, and the first nut 42 may be attached to the second surface 31b of the mounting wall 31.

Referring to FIG. 6, a longitudinal axis X1 of the first bolt 41 may be aligned with a longitudinal axis X of the reinforcing member 20. The first bolt 41 may extend through the lower portion of the partition 12 and the through hole of the mounting wall 31, and threads of the first bolt 41 may be screwed into the first nut 42 so that the first end portion 21 of the reinforcing member 20 may be joined to the lower portion of the corresponding partition 12.

Figure 4:
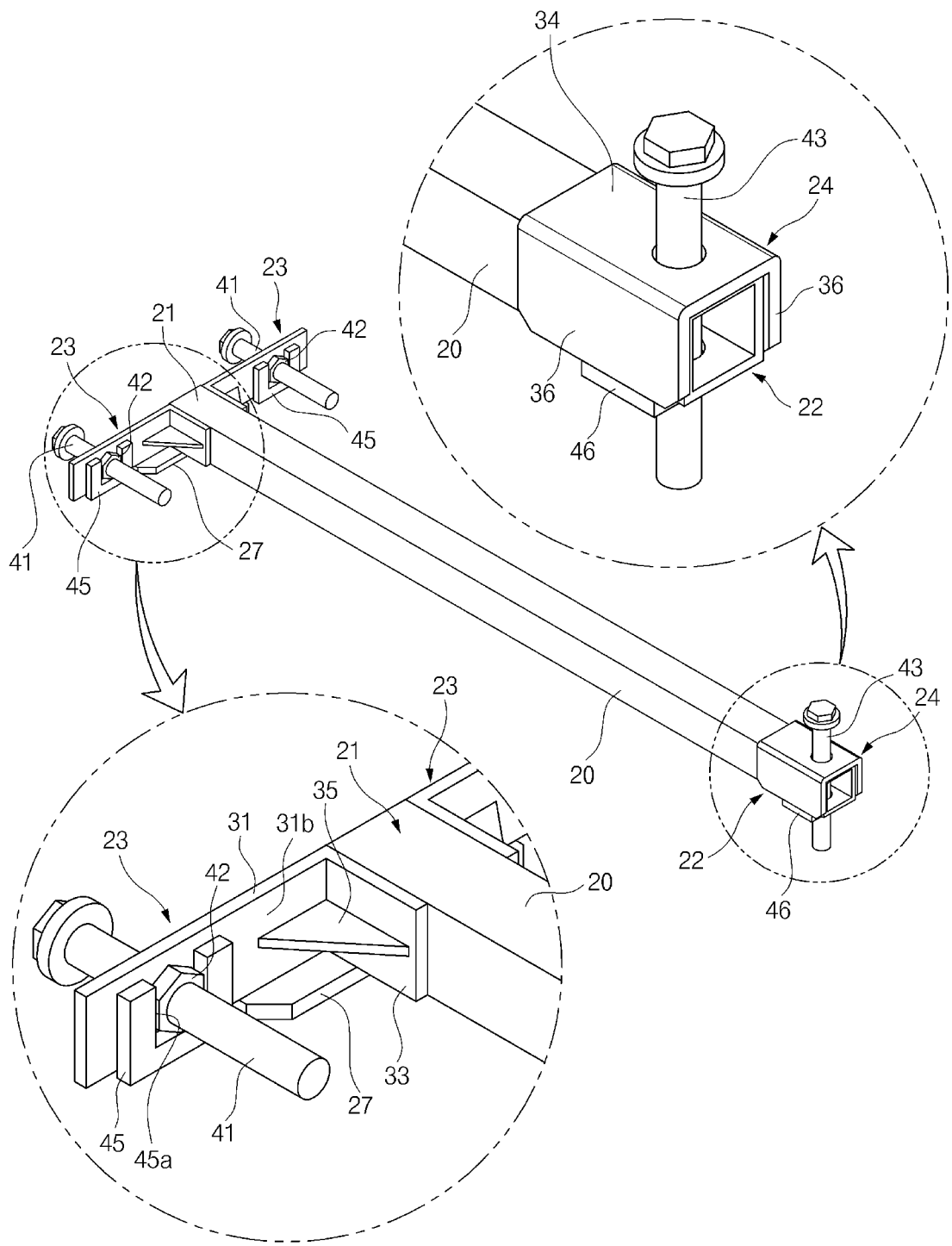
FIG. 4 illustrates a perspective view of a reinforcing member for a chassis frame according to an exemplary embodiment of the present disclosure.
Figure 5:
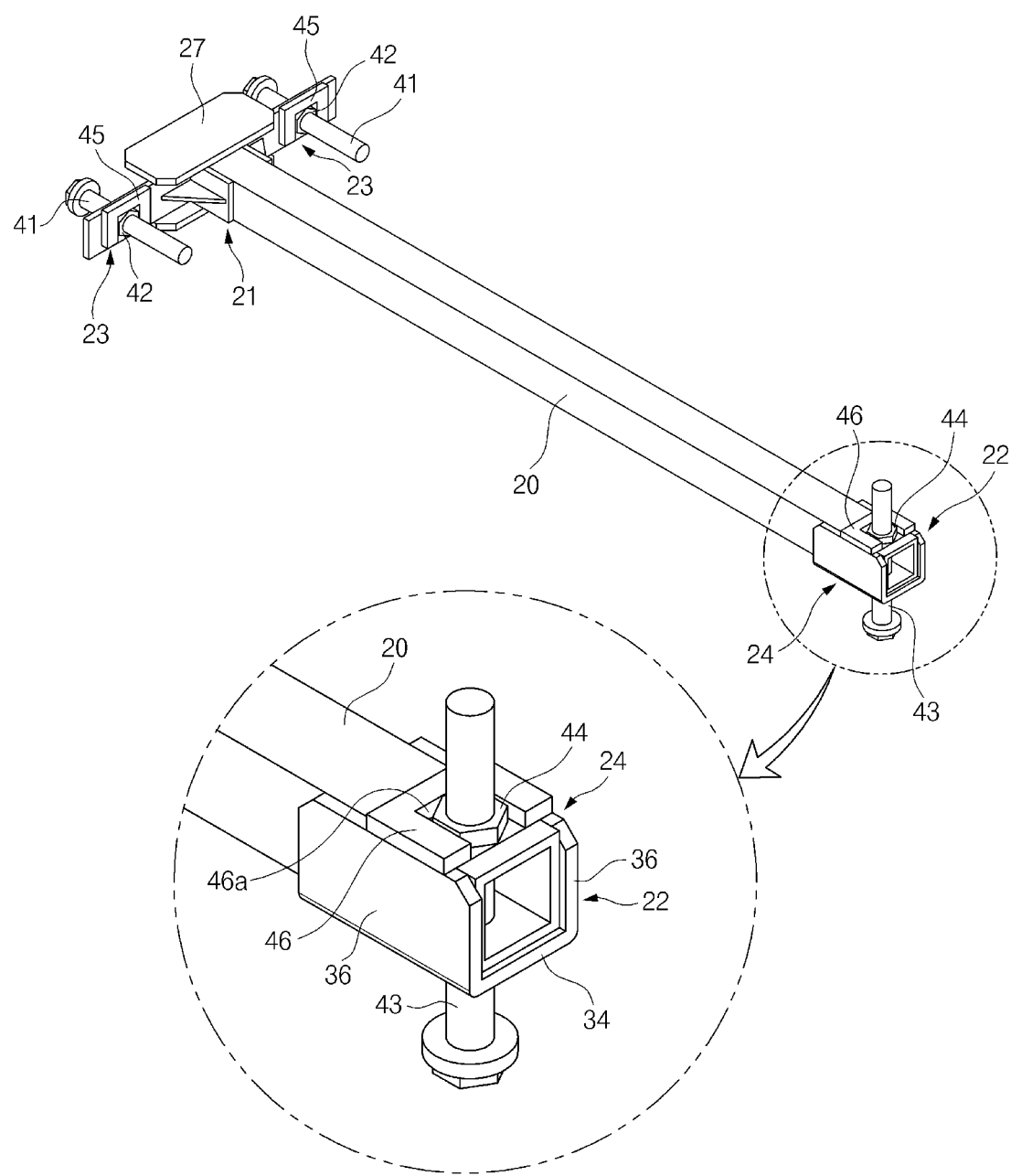
FIG. 5 illustrates a perspective view of the reinforcing member illustrated in FIG. 4, which is turned upside down.

Referring to FIGS. 4 and 5, a first stopper 45 may be provided on the second surface 31b of the mounting wall 31, and the first stopper 45 may have a U shape in which a top portion thereof is opened upwardly. Accordingly, the first stopper 45 may have a U-shaped recess 45a opened upwardly, and the first nut 42 may be received in and restricted by the U-shaped recess 45a of the first stopper 45 so that the first nut 42 may be accurately aligned and positioned in the through hole of the mounting wall 31.

According to an exemplary embodiment, the first stopper 45 may be manufactured separately from the mounting wall 31, and the first stopper 45 may be fixed to the second surface 31b of the mounting wall 31 by welding and/or the like. According to another exemplary embodiment, the first stopper 45 may be integrally formed with the second surface 31b of the mounting wall 31 so that the first stopper 45 and the mounting wall 31 may form a unitary one-piece structure.

Referring to FIGS. 4 and 5, a second reinforcing bracket 24 may be integrally connected to the reinforcing member 20 while surrounding an exterior surface of the second end portion 22, thereby increasing stiffness of the second end portion 22 of the reinforcing member 20. The second reinforcing bracket 24 may include a pair of side walls 36 attached to both side surfaces of the second end portion 22, and a top wall 34 attached to a top surface of the second end portion 22. The second reinforcing bracket 24 may have a U shape with the pair of side walls 36 and the top wall 34. The second reinforcing bracket 24 may be directly attached to the side walls and the top wall of the second end portion 22 except for a bottom wall of the second end portion 22, thereby improving stiffness of the second end portion 22.

The top wall 34 of the second reinforcing bracket 24 may have a through hole through which the second bolt 43 passes, and the second end portion 22 of the reinforcing member 20 have a through hole through which the second bolt 43 passes. The through hole of the top wall 34 of the second reinforcing bracket 24 may be aligned with the through hole of the second end portion 22 of the reinforcing member 20, and accordingly the second bolt 43 may extend through a through hole of the lower reinforcing member 12b of the partition 12, the through hole of the top wall 34, and the through hole of the second end portion 22. The second nut 44 may be attached to the bottom surface of (bottom wall) of the second end portion 22 of the reinforcing member 20, and the second nut 44 may be aligned with the through hole of the second end portion 22.

Referring to FIG. 6, a longitudinal axis X2 of the second bolt 43 may be perpendicular to the longitudinal axis X of the reinforcing member 20. The second bolt 43 may extend through the through hole of the lower reinforcing member 12b of the partition 12, the through hole of the top wall 34 of the second reinforcing bracket 24, and the through hole of the second end portion 22 of the reinforcing member 20, and threads of the second bolt 43 may be screwed into the second nut 44 so that the second end portion 22 of the reinforcing member 20 and the second reinforcing bracket 24 may be joined to the lower reinforcing member 12b of the corresponding partition 12.

Referring to FIG. 5, a second stopper 46 may be attached to the bottom surface of the second end portion 22 of the reinforcing member 20, and the second stopper 46 may have a U shape in which a portion thereof is opened toward the corresponding partition 12. Accordingly, the second stopper 46 may have a U-shaped recess 46a defined therein, and the second nut 44 may be received in and restricted by the U-shaped recess 46a of the second stopper 46 so that the second nut 44 may be accurately aligned and positioned in the through hole of the second end portion 22.

According to an exemplary embodiment, the second stopper 46 may be manufactured separately from the second end portion 22 of the reinforcing member 20, and the second stopper 46 may be fixed to the bottom surface of the second end portion 22 of the reinforcing member 20 by welding and/or the like. According to another exemplary embodiment, the second stopper 46 may be integrally formed with the second end portion 22 of the reinforcing member 20 so that the second stopper 46 and the reinforcing member 20 may form a unitary one-piece structure.

The second stopper 46 may be attached to the bottom surface of the second end portion 22 of the reinforcing member 20 so that it may firmly bear a torque of the second bolt 43 when the second bolt 43 is screwed into the second nut 44, thereby improving the mounting stiffness of the second end portion 22 of the reinforcing member 20.

The longitudinal axis X1 of the first bolt 41 may be parallel to or aligned with the longitudinal axis X of the reinforcing member 20, and the longitudinal axis X2 of the second bolt 43 may be perpendicular to the longitudinal axis X of the reinforcing member 20. Accordingly, the longitudinal axis X1 of the first bolt 41 may be perpendicular to the longitudinal axis X2 of the second bolt 43, and a fastening direction of the first bolt 41 may be perpendicular to that of the second bolt 43. By fastening the second end portion 22 of the reinforcing member 20 and the lower reinforcing member 1213, of the corresponding partition 12 using the second bolt 43 and the second nut 44, and then fastening the first end portion 21 of the reinforcing member 20 and the lower portion of the corresponding partition 12 using the first bolt 41 and the first nut 42 in a state in which the first end portion 21 of the reinforcing member 20 is accurately aligned with the lower portion of the corresponding partition 12, the reinforcing member 20 may be held in position between the lower portions of the two adjacent partitions 12.

Figure 7:
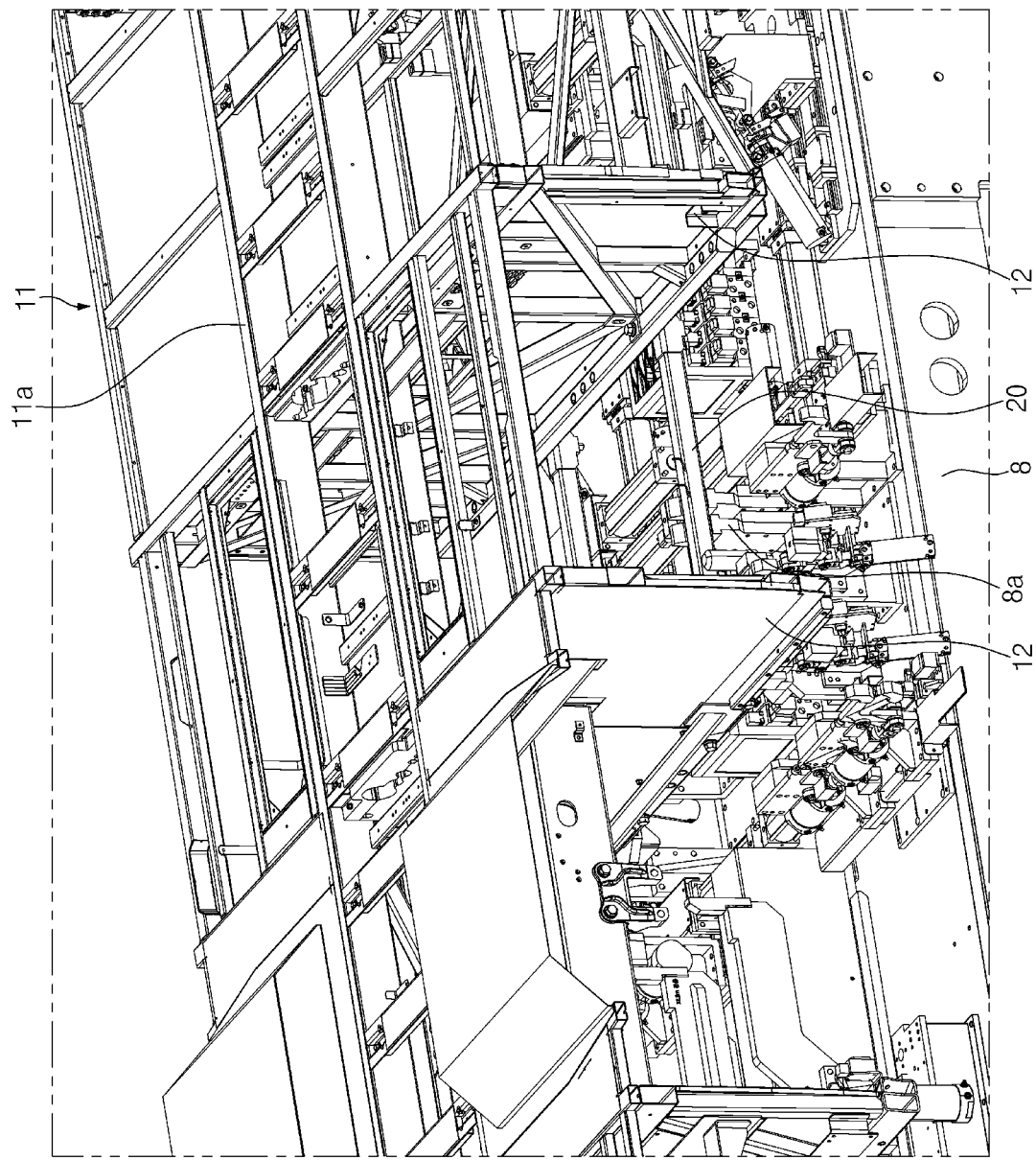
FIG. 7 illustrates a state in which reinforcing members of a chassis frame according to an exemplary embodiment of the present disclosure are seated on a seat unit of an assembly jig.

In a condition in which the plurality of reinforcing members 20 are connected to the partitions 12 of the chassis frame 10 through the bolts 41 and 43 and the nuts 42 and 44, when the chassis frame 10 is seated on an assembly jig 8 as illustrated in FIG. 7, the plurality of reinforcing members 20 may be stably seated on a seat unit 8a of the assembly jig 8 so that the chassis frame 10 may be accurately positioned with respect to the assembly jig 8 by the plurality of reinforcing members 20. Since the reinforcing members 20 are seated on the seat unit 8a of the assembly jig 8, an assembly jig used for the assembly of an existing chassis frame may be applied to the chassis frame 10 according to an exemplary embodiment of the present disclosure without any modification thereto, and thus the manufacturing cost of the chassis frame 10 may be reduced.

Figure 8:
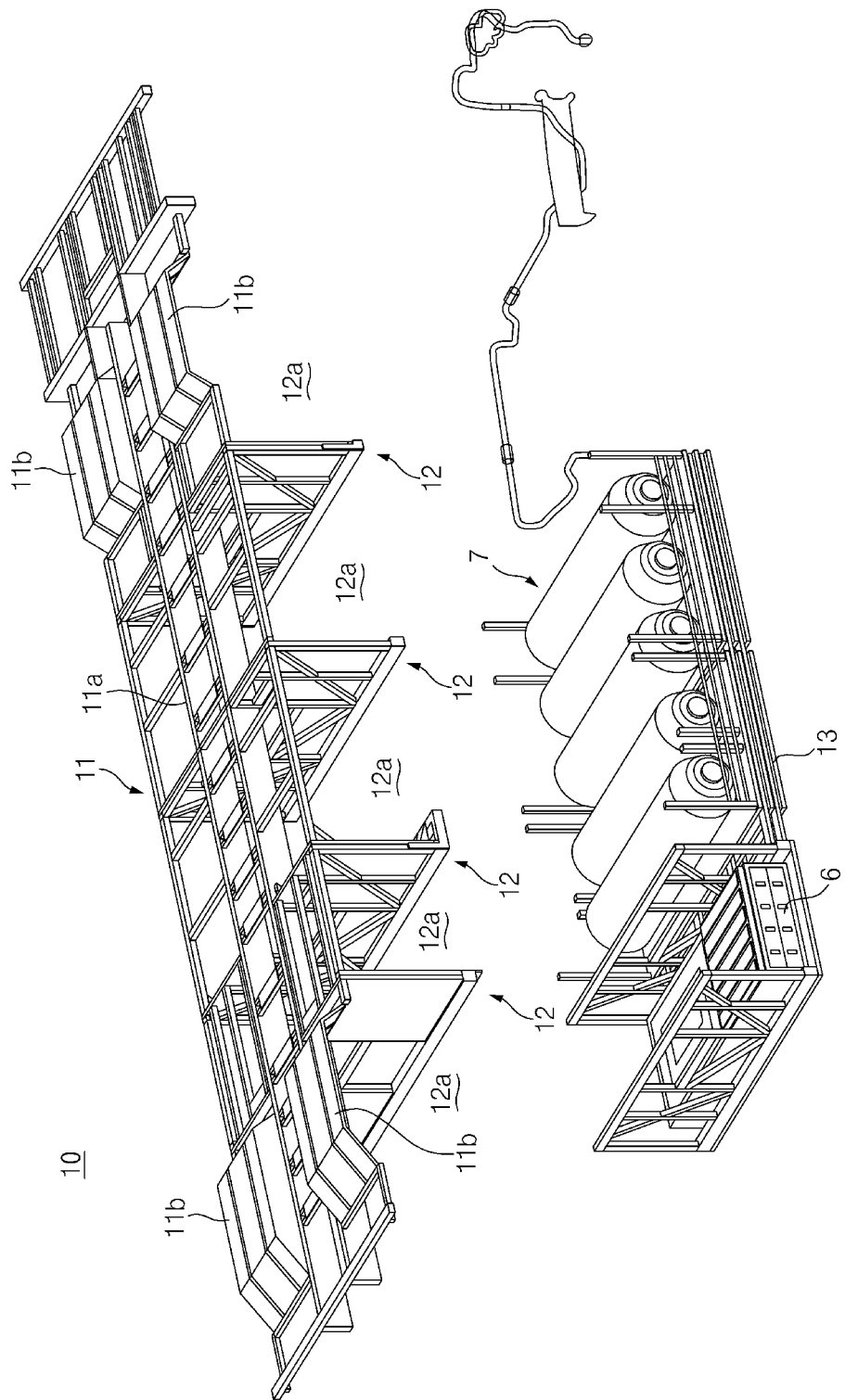
FIG. 8 illustrates the vertical loading of a lower frame on a chassis frame according to an exemplary embodiment of the present disclosure.
Figure 9:
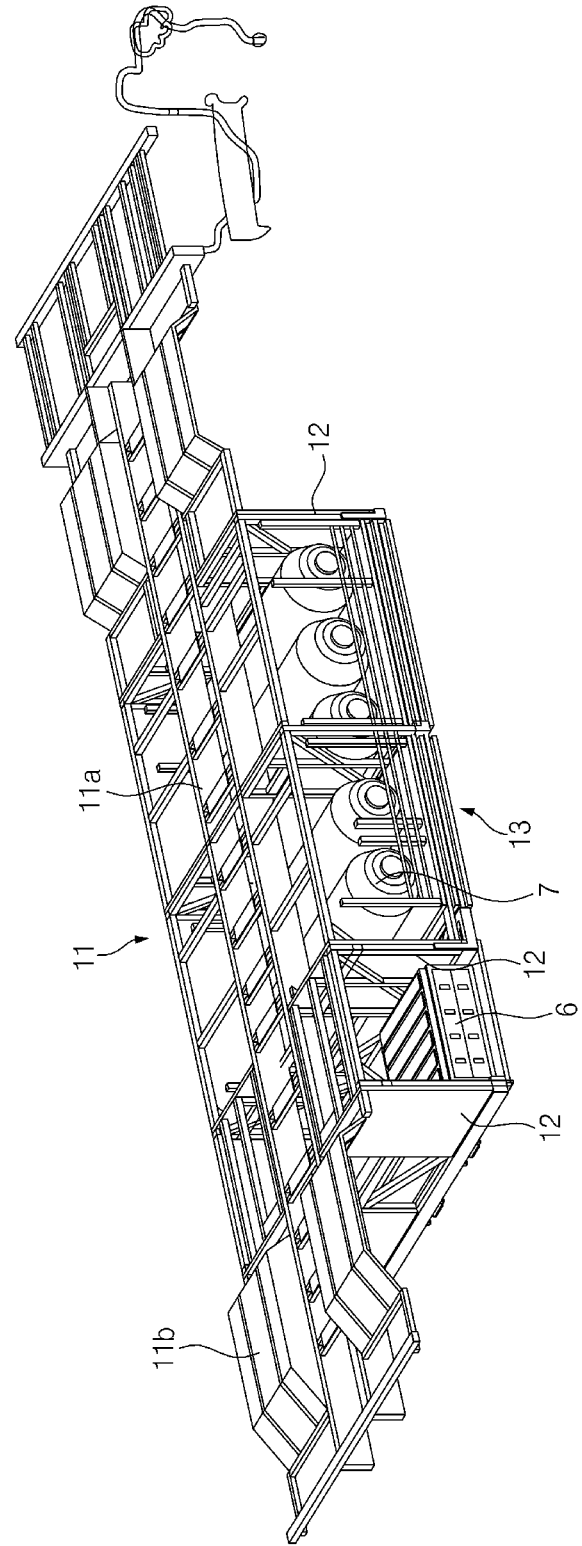
FIG. 9 illustrates a state in which a lower frame is assembled to a chassis frame according to an exemplary embodiment of the present disclosure.

Referring to FIG. 8, a plurality of modules 6 and 7 such as a battery module 6 and a hydrogen tank module 7 may be mounted on a lower frame 13, and the plurality of reinforcing members 20 may be separated from the partitions 12 of the chassis frame 10 so that the mounting spaces divided by the partitions 12 may be downwardly opened. In this state, the lower frame 13 having the plurality of modules 6 and 7 therein may be vertically loaded and assembled to the chassis frame 10 so that the plurality of modules 6 and 7 may be individually received in the corresponding mounting spaces as illustrated in FIG. 9.

As set forth above, the chassis frame according to exemplary embodiments of the present disclosure may have the plurality of reinforcing members detachably connected to the lower portion thereof, thereby facilitating the assembly of various modules and effectively preventing the chassis frame from being deformed or bent during the transportation and storage of the chassis frame.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A chassis frame comprising:
an upper frame;
a plurality of partitions extending downwardly from the upper frame and having lower portions; and
a reinforcing member detachably connected to lower portions of adjacent ones of the partitions, the reinforcing member comprising:
a first end portion;
a second end portion opposite the first end portion, the first end portion and the second end portion detachably connected to lower portions of corresponding partitions, respectively; and
a pair of first reinforcing brackets provided on both sides of the first end portion, each first reinforcing bracket comprising a mounting wall detachably mounted on the lower portion of the corresponding partition through a first bolt and a first nut.

2. The chassis frame according to claim 1, wherein the first reinforcing bracket further comprises a fixed wall that is fixed to a side surface of the first end portion, the fixed wall extending in a longitudinal direction of the reinforcing member.

3. The chassis frame according to claim 2,
wherein the mounting wall is perpendicular to the fixed wall.

4. The chassis frame according to claim 1, wherein the reinforcing member further comprises a support plate connecting bottom ends of the pair of first reinforcing brackets, the support plate protruding from the mounting wall of the pair of first reinforcing brackets in opposite directions.

5. The chassis frame according to claim 1,
wherein the mounting wall has a first surface directly contacting the corresponding partition and a second surface opposite the first surface,
wherein the reinforcing member further comprises a first stopper provided on the second surface of the mounting wall, the first stopper having a U-shaped recess, and wherein the first nut is received in the U-shaped recess of the first stopper.

6. The chassis frame according to claim 1, wherein a longitudinal axis of the first bolt is parallel to a longitudinal axis of the reinforcing member.

7. The chassis frame according to claim 3, wherein the first reinforcing bracket further comprises a connection rib connecting the mounting wall and the fixed wall.

8. A chassis frame comprising:
an upper frame;
a plurality of partitions extending downwardly from the upper frame and having lower portions; and
a reinforcing member detachably connected to the lower portions of adjacent ones of the partitions, the reinforcing member comprising:
a first end portion and a second end portion opposite the first end portion, the first end portion and the second end portion detachably connected to the lower portions of corresponding partitions, respectively; and
a reinforcing bracket at least partially surrounding an exterior surface of the second end portion, the reinforcing bracket detachably connected to the lower portion of the corresponding partition through a bolt and a nut.

9. The chassis frame according to claim 8, wherein the reinforcing bracket comprises:
a top wall attached to a top surface of the second end portion; and
a pair of side walls attached to both side surfaces of the second end portion, respectively.

10. The chassis frame according to claim 9,
wherein the reinforcing member further comprises a stopper attached to a bottom surface of the second end portion, the stopper having a U-shaped recess, and
wherein the nut is received in the U-shaped recess of the stopper.

11. The chassis frame according to claim 8, wherein a longitudinal axis of the bolt is perpendicular to a longitudinal axis of the reinforcing member.

12. A method of forming a chassis frame, the method comprising:
disposing a plurality of partitions extending downwardly from an upper frame, the partitions having lower portions; and
detachably connecting a reinforcing member to lower portions of adjacent ones of the partitions,
wherein the reinforcing member comprises a first end portion and a second end portion opposite the first end portion,
wherein the first end portion and the second end portion are detachably connected to the lower portions of corresponding partitions, respectively, and
wherein the reinforcing member further comprises a pair of first reinforcing brackets provided on both sides of the first end portion, each first reinforcing bracket comprising a mounting wall detachably mounted on the lower portion of the corresponding partition through a first bolt and a first nut.

13. The method according to claim 12, wherein the first reinforcing bracket further comprises a fixed wall that is fixed to a side surface of the first end portion, the fixed wall extending in a longitudinal direction of the reinforcing member.

14. The method according to claim 13,
wherein the mounting wall is perpendicular to the fixed wall.

15. The method according to claim 12, wherein the reinforcing member further comprises a support plate connecting bottom ends of the pair of first reinforcing brackets, the support plate protruding from the mounting wall of the pair of first reinforcing brackets in opposite directions.

16. The method according to claim 12,
wherein the mounting wall has a first surface directly contacting the corresponding partition and a second surface opposite the first surface,
wherein the reinforcing member further comprises a first stopper provided on the second surface of the mounting wall, the first stopper having a U-shaped recess, and
wherein the first nut is received in the U-shaped recess of the first stopper.

17. The method according to claim 12, wherein a longitudinal axis of the first bolt is parallel to a longitudinal axis of the reinforcing member.

18. The method according to claim 14, wherein the first reinforcing bracket further comprises a connection rib connecting the mounting wall and the fixed wall.

* * * * *